(12) United States Patent
Chen et al.

(10) Patent No.: US 8,638,364 B2
(45) Date of Patent: Jan. 28, 2014

(54) USER INTERFACE SYSTEM AND METHOD USING THERMAL IMAGING

(75) Inventors: Ruxin Chen, Redwood City, CA (US); Steven Osman, San Francisco, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 356 days.

(21) Appl. No.: 12/969,501

(22) Filed: Dec. 15, 2010

(65) Prior Publication Data
US 2012/0075463 A1 Mar. 29, 2012

Related U.S. Application Data

(63) Continuation-in-part of application No. 12/889,347, filed on Sep. 23, 2010.

(51) Int. Cl.
*H04N 7/18* (2006.01)
*A63F 9/24* (2006.01)
*A61B 5/08* (2006.01)

(52) U.S. Cl.
USPC ........ 348/135; 463/1; 463/2; 463/31; 463/37; 463/39; 600/529

(58) Field of Classification Search
USPC .................. 348/135; 600/549, 529; 382/128; 463/37, 1–2, 31, 39
See application file for complete search history.

(56) References Cited

U.S. PATENT DOCUMENTS

| | | | |
|---|---|---|---|
| 4,996,161 A * | 2/1991 | Conners et al. ............... 436/132 |
| 5,689,241 A | 11/1997 | Clarke, Sr. | |
| 5,764,786 A | 6/1998 | Kuwashima et al. | |
| 5,994,701 A * | 11/1999 | Tsuchimoto et al. ......... 250/351 |
| 6,421,617 B2 | 7/2002 | Felsenstein | |
| 7,477,309 B2 | 1/2009 | Cuccias | |
| 8,033,996 B2 | 10/2011 | Behar | |
| 8,218,871 B2 | 7/2012 | Angell et al. | |
| 2002/0017300 A1 | 2/2002 | Hickle et al. | |
| 2002/0083025 A1* | 6/2002 | Robarts et al. .................. 706/12 |
| 2003/0108223 A1 | 6/2003 | Prokoski | |
| 2006/0264773 A1 | 11/2006 | Gannon | |
| 2006/0293606 A1 | 12/2006 | Tomita | |
| 2007/0180979 A1 | 8/2007 | Rosenberg | |
| 2007/0285510 A1* | 12/2007 | Lipton et al. ................... 348/135 |
| 2008/0171596 A1* | 7/2008 | Hsu ................................ 463/39 |
| 2008/0318192 A1 | 12/2008 | Jones | |
| 2009/0247222 A1 | 10/2009 | Bonnat | |
| 2010/0063997 A1 | 3/2010 | Sako et al. | |
| 2010/0069774 A1 | 3/2010 | Bingham et al. | |
| 2010/0130873 A1 | 5/2010 | Yuen et al. | |
| 2010/0177968 A1* | 7/2010 | Fry et al. ........................ 382/224 |

(Continued)

OTHER PUBLICATIONS

PCT International Search Report dated Jan. 11,201 for international application No. PCT/US11/52182.

(Continued)

*Primary Examiner* — David Czekaj
*Assistant Examiner* — Tsion B Owens
(74) *Attorney, Agent, or Firm* — Joshua D. Isenberg; JDI Patent

(57) ABSTRACT

A thermal imaging interface for control of a computer program may obtain one or more thermal infrared images of one or more objects with one or more thermographic cameras. The images may be analyzed to identify one or more characteristics of the objects. Such characteristics may be used as a control input in the computer program.

26 Claims, 5 Drawing Sheets

(56) References Cited

U.S. PATENT DOCUMENTS

| | | |
|---|---|---|
| 2011/0081969 A1* | 4/2011 | Ikeda et al. .................... 463/37 |
| 2011/0197263 A1 | 8/2011 | Stinson, III |
| 2012/0052469 A1 | 3/2012 | Sobel et al. |
| 2012/0075462 A1 | 3/2012 | Chen et al. |

OTHER PUBLICATIONS

Non-Final Office Action mailed date Feb. 19, 2013 issued for U.S. Appl. No. 12/889,347.

Murthy et al. Non-contact Monitoring of Breathing Function Using Infrared Imaging. Department of Computer Science, University of Houston, Technical Report No. UH-CS-05-09. Apr. 9, 2005 [retrieved on Nov. 11, 2011]. Retrieved from the internet:URL: http://www.cs.uh.edu/docs/cosc/technical-reports/2005/05-09.pdf.

PCT International Search Report dated Nov. 30, 2011 for international application No. PCT/US2011/045595.

Final Office Action mailed Jul. 3, 2013 for U.S. Appl. No. 12/889,347.

Office Action of Oct. 23, 2013 for U.S. Appl. No. 12/889,347.

* cited by examiner

USER INTERFACE SYSTEM AND METHOD USING THERMAL IMAGING

CLAIM OF PRIORITY

This application is a continuation-in-part and claims the priority benefit of commonly-assigned co-pending U.S. patent application Ser. No. 12/889,347, entitled BLOW TRACKING INTERFACE SYSTEM AND METHOD, to Ruxin Chen and Steven Osman, filed Sep. 23, 2010, the entire contents of which are incorporated herein by reference.

FIELD OF THE INVENTION

Embodiments of this invention are directed to user interfaces for control of computer systems and more specifically to user interfaces that use thermal imaging to provide or augment control input to a computer program.

BACKGROUND OF THE INVENTION

There are a number of different control interfaces that may be used to provide input to a computer program. Examples of such interfaces include well-known interfaces such as a computer keyboard, mouse or joystick controller. Such interfaces typically have analog or digital switches that provide electrical signals that can be mapped to specific commands or input signals that affect the execution of a computer program.

Recently, interfaces have been developed for use in conjunction with video games that rely on other types of input. There are interfaces based on microphones or microphone arrays, interfaces based on cameras or camera arrays. Microphone-based systems are used for speech recognition systems that try to supplant keyboard inputs with spoken inputs. Microphone array based systems can track sources of sounds as well as interpret the sounds. Camera based interfaces attempt to replace joystick inputs with gestures and movements of a user or an object held by a user.

Different interfaces have different advantages and drawbacks. Keyboard interfaces are good for entering text but less useful for entering directional commands. Joysticks and mice are good for entering directional commands and less useful for entering text. Camera-based interfaces are good for tracking objects in two-dimensions but generally require some form of augmentation (e.g., use of two cameras or a single camera with echo-location) to track objects in three dimensions. Such augmentation can increase the cost of a camera-based system. Some camera-based systems employ face tracking software to track movement of a user's face in images obtained with one or more cameras. However, image tracking systems can sometimes be confused by objects that resemble a person's face. In addition, such systems may have difficulty distinguishing a person in an image from a background in the image.

It would be desirable to provide an interface that is intuitive to use and is also relatively inexpensive to implement that overcomes the above disadvantages.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Embodiments of the present invention implement a new user interface for computer programs based on the detection of various user characteristics through thermal imaging to provide a control input.

Introduction

Embodiments of the present invention can overcome the disadvantages associated with the prior art through use of thermal imaging in conjunction with a user interface to provide or augment input to a computer system. Thermal imaging cameras can provide information about the temperature or variation in temperature of objects within an image. The variation in temperature can distinguish objects that might otherwise appear identical in an image taken with a conventional (visible light) camera. The variation in temperature may also be used to detect certain characteristics of each object that may be used to control a computer program.

Embodiments

Figure 1:
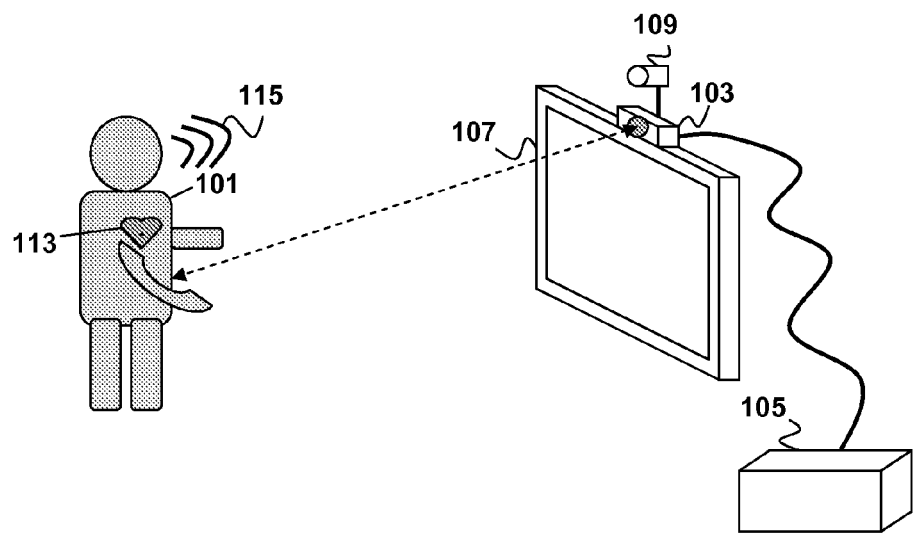
FIG. 1 is a schematic diagram illustrating a thermal imaging interface method for control of a computer program according to an embodiment of the present invention.

Examples of embodiments of the invention may be understood by first referring to FIG. 1. FIG. 1 is a schematic diagram illustrating a possible system for controlling a computer program using a thermal imaging interface. The system 100 generally includes a thermographic camera 103 coupled to a computer processing system 105. The thermographic camera 103 may be positioned proximate a video display 107 that is coupled to the processing system 105 such that the user 101 faces the camera 103 when facing the display 107.

Use of a thermographic camera 103 to track various user characteristics (e.g., heart rate, respiration rate) is particularly advantageous because it avoids the need to put sensors on the user's body. Additional information about the user may be obtained with much less intrusion. Tracking the heart rate of a user through thermographic imaging avoids the need for attaching a pulse monitor to the body. Likewise, tracking the respiration rate through thermographic imaging avoids the need for attaching a headset or microphone to the user's face. Ultimately, the functionality of the computer program can be further optimized through processing of this additional information without compromising the user's mobility and comfort.

Determining user characteristics using a thermographic camera 103 is also advantageous because it avoids the need for the user to hold a controller device by hand to ascertain those characteristics. This frees the user's hands for other tasks, or allows the controller to perform other tasks.

As used herein, a thermographic camera refers to a type of camera sometimes called a Forward Looking Infrared (FLIR) or infrared camera that forms an image using infrared radiation. The thermographic camera 103 forms an image using one or more lenses and a sensor in a fashion similar to a camera that forms an image using visible light. Instead of the 450-750 nanometer range of the visible light camera, an infrared camera can operate in wavelengths as long as 14,000 nm (14 μm).

The thermographic camera 103 can take advantage of the fact that all objects emit a certain amount of black body radiation as a function of their temperatures. Generally speaking, the higher an object's temperature, the more infrared radiation the body emits as black-body radiation. An infrared camera can detect this radiation in a way similar to the way an ordinary camera detects visible light. However, since bodies emit infrared radiation even in total darkness, the ambient light level does not matter.

Embodiments of the present invention may use more than one thermographic camera. For example, two thermographic cameras may be used in a side-by-side configuration to provide stereoscopic (3D) images that can provide three-dimensional information. An equivalent thermographic "stereo" camera may be implemented in a single device having side-by-side lenses that image different views of the some scene onto a sensor or array of sensors. Multiple cameras might be used to create a three-dimensional representation of any number of user characteristics (e.g., breath volume and rate of flow).

The thermographic camera 103 may use a cooled thermal sensor or an uncooled thermal sensor operating at ambient temperature, or a sensor stabilized at a temperature close to ambient using small temperature control elements. Modern uncooled detectors use sensors that detect changes in resistance, voltage or current when heated by infrared radiation. These changes can then be measured and compared to values at the operating temperature of the sensor. Uncooled infrared sensors can be stabilized to an operating temperature to reduce image noise, but they are not cooled to low temperatures and do not require bulky, expensive cryogenic coolers. This makes infrared cameras smaller and less costly.

Uncooled detectors are mostly based on pyroelectric and ferroelectric materials or microbolometer technology. These materials are used to form a detector having an array of pixels with highly temperature-dependent properties. These pixels can be thermally insulated from the surrounding environment and read electronically.

Ferroelectric detectors operate close to a phase transition temperature of the sensor material. The pixel temperature of the detector is calibrated to a highly temperature-dependent polarization charge on the detector material. The achieved noise equivalent temperature difference (NETD) of ferroelectric detectors with f/1 optics and 320×240 sensors can be 70-80 mK. An example of a possible ferroelectric sensor assembly consists of barium strontium titanate bump-bonded by polyimide thermally insulated connection. Other possible phase-change materials that can be used in infrared detectors include lanthanum barium manganite (LBMO), a metal insulator phase change material.

There is another possible detector that can detect small changes in the electrical resistance of a sensor material. Such a device is sometimes called a microbolometer. Microbolometers can reach NETD down to 20 mK. A typical microbolometer may include a thin film vanadium (V) oxide sensing element suspended on silicon nitride bridge above the silicon-based scanning electronics. The electric resistance of the sensing element can be measured once per frame.

It is noted that the location of the thermographic camera 103 is somewhat arbitrary in the example shown in the FIG. 1. The thermographic camera 103 can be placed on top of a video display 107 facing a user 101. Alternatively, the thermographic camera can be mounted to a hand-held game controller or a portable game device. However, embodiments of the present invention are not limited to such configurations.

The values of temperature (or temperature difference) at each pixel of the image sensor in the thermographic camera can be stored in a memory of the computer system 105 as an array. A program executed on the computer system 105 can analyze the temperature patterns in the array to distinguish a user from the user's surroundings, or the distance from the thermographic camera 103 to the user. Additionally, the temperature patterns in the array may be used to determine a user's respiration rate 115 as well as a user's heart rate 113.

In some embodiments a second thermographic camera or a conventional (i.e., visible light) camera, may be used as an auxiliary sensor 109 to provide an additional source of information, e.g., thermographic, acoustic, or video image information, that additionally characterizes the user. By way of example, and not by way of limitation, a separate visible light camera 109 may be coupled with the thermographic camera 103. The separate (additional) visible light camera may initially make a determination of the location of all the objects in the room. Often, however, objects can blend into their surroundings due to the lack of variation in color or texture between an object and its background. The thermographic camera 103 can provide additional thermographic information that may be combined with the information from the visible light camera 109 to more accurately define the location of objects in the room and the location of a specific area of an object. For example, thermographic information can be used in conjunction with acoustic information, e.g., from a microphone or microphone array, to identify which individual within a given thermographic image is a source of sounds, such as vocal sounds, whistling, coughing, or sneezing.

Figure 2A:
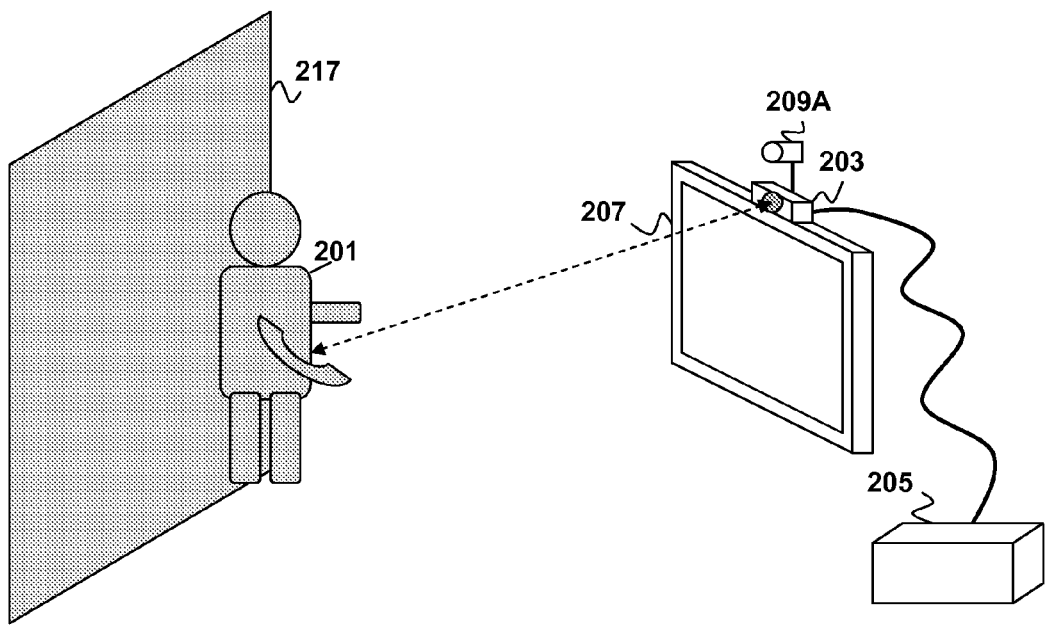
FIGS. 2A-2B are schematic diagrams illustrating use of a thermal imaging interface according to an embodiment of the present invention.
Figure 2B:
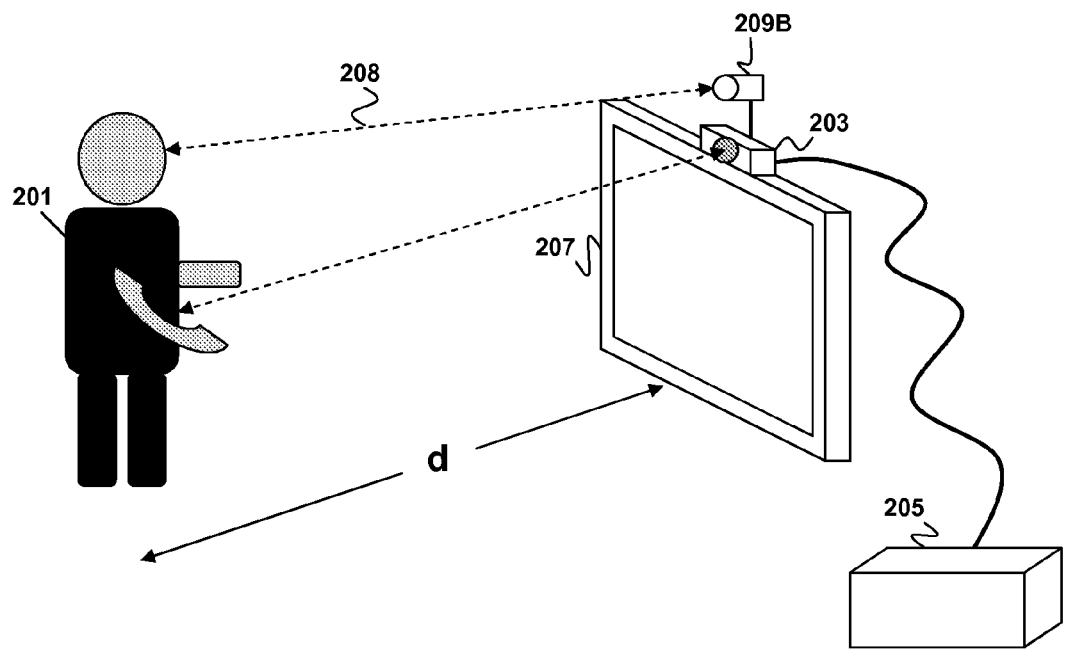

FIGS. 2A and 2B illustrate examples of locating a user's position in relation to the user's surroundings using thermal infrared imaging according to an embodiment of the present invention.

Many video game platforms currently use visible light cameras to determine the spatial position of objects and surroundings such that those objects/surroundings may interact with the game (e.g., via augmented reality software) in accordance with their actual physical locations. Actual physical motion or action of the objects can be mapped to corresponding actions of virtual objects during game play. As such, it is increasingly important for a video game system to accurately perceive and distinguish objects in its field of view.

While visible light cameras do a good job of differentiating between objects in their field of view, they are not equipped to distinguish between objects in all situations. For example, when the color or texture of an object resembles that of its background, software that analyzes images from the visible light camera may mistakenly categorize both the object and background as one large object rather than two distinct objects. The potential for this type of inaccuracy may be abated by the introduction of information obtained with a thermographic camera.

FIG. 2A illustrates an example of a system that uses thermal infrared imaging to differentiate objects from their surroundings according to an embodiment of the present invention. A thermographic camera 203 can be coupled to a computer processing system 205. The thermographic camera 203 may be positioned proximate a video display 207 that is coupled to the processing system 205 such that the user 201 faces the thermographic camera 203 when facing the display 207. Additionally, a visible light camera 209A can be positioned to face the same direction as the thermographic camera 203. The visible light camera 209A can be used as an auxiliary sensor.

The user 201 can be positioned directly in front of the background (e.g., wall) 217. In this example, the user 201 is wearing clothing with a similar color to that of the background 217. Initially the visible light camera 209A is used to determine the physical location of all objects in its field of view. However, because of the similarity in color between the user 201 and his background 217 the software analyzing images from the visible light camera 209A recognizes both the user 201 and the background 217 as a single object.

This problem can be resolved by the introduction of information obtained with the thermographic camera 203. In this case, image analysis software may supplement the information obtained with the visible light camera 209A with information obtained with the thermographic camera 203 in characterizing the user 201 and surroundings 217. As discussed above, the thermographic camera 203 can capture images of its surroundings based on the emission of blackbody radiation. Because the user 201 is a living, breathing being, it emits a completely different spectrum of blackbody radiation than that of the background 217 (an inanimate object). The thermographic camera 203 is able to record this information and send it to the computer processor 205. By comparing the blackbody radiation emission profiles for both the user 201 and background 217, image analysis software executed by the computer processor 205 can determine that two unique objects are depicted in an image rather than just one. The computer processor 205 may then tag each unique object with a segmentation cue for future identification and processing.

Once the thermographic camera 203 has enabled the computer processor 205 to identify the location of objects within its field of view, the computer processor 205 may then be configured to continue tracking movement of the objects (e.g., hand and arm movement of a user) using the previously determined segmentation cue. When coupled with a visible light camera 209A, the thermographic camera 203 provides an additional source for tracking movement that will increase the overall accuracy of the system.

In addition to providing an alternative or complementary mechanism for distinguishing objects from each other in its field of view, a thermographic camera may also act as a complementary mechanism for determining the depth of objects in its field of view. FIG. 2B illustrates an example of a system that uses thermal infrared imaging to determine the depth of an object according to an embodiment of the present invention.

Again, a thermographic camera 203 can be coupled to a computer processing system 205. The thermographic camera 203 is positioned proximate a video display 207 that is coupled to the processing system 205 such that the user 201 faces the camera 203 when facing the display 207. By way of example, and not by way of limitation, an infrared emitter and sensor 209B that is positioned to face the same direction as the thermographic camera 203, is used as an auxiliary sensor.

In some embodiments of depth detection, an infrared emitter and sensor 209B can be used to determine the distance of an object (e.g., the user 201). The emitter 209B sends out a pulse of infrared light 208 toward the user 201, which reflects part of the infrared light 208 in the pulse. The sensor 209B then detects the reflected infrared light 208. The distance d from the emitter and sensor 209B to different parts of the user 201 can be estimated by determining the relative timing of the emission of the pulse by the emitter 209B and the detection of the reflected pulse by the sensor 209B.

Occasionally, however, the emitter and sensor 209B may fail to detect the depth d of all or part of the corresponding object. If the object (or part of the object) is IR black (i.e., does not reflect infrared light), the emitter and sensor 209B will be unable to determine the depth of that particular part of the object using the reflection of infrared light alone.

At this point, the thermographic camera 203 may provide a complementary method for determining an object's depth. The thermographic camera 203 may identify an object from its surroundings using that object's blackbody radiation profile, as discussed above. Having identified the object (e.g., user 201), the computer processing system 205 may then compare depth data obtained from the infrared emitter and sensor 209B with data obtained from thermal imaging. Finally, the computer processing system 205 may interpolate the depth of the missing parts of the object using the thermal imaging data.

In some other implementations of the present invention, depth d of an object may be determined by use of the thermographic camera alone. By way of example, and not by way of limitation, cool air emanating from the location of the thermographic camera (or some other known location) may be blown toward the object. The distance from the thermographic camera to the object could then be gauged by measuring the time needed for the thermal perturbation caused by the cool air to reach the object.

Besides being able to identify/differentiate objects within its field of view and also being able to determine the relative depth of those objects, the thermographic camera may also be configured to provide additional information about a user (or group of users) through its ability to detect respiration rate.

Figure 3:
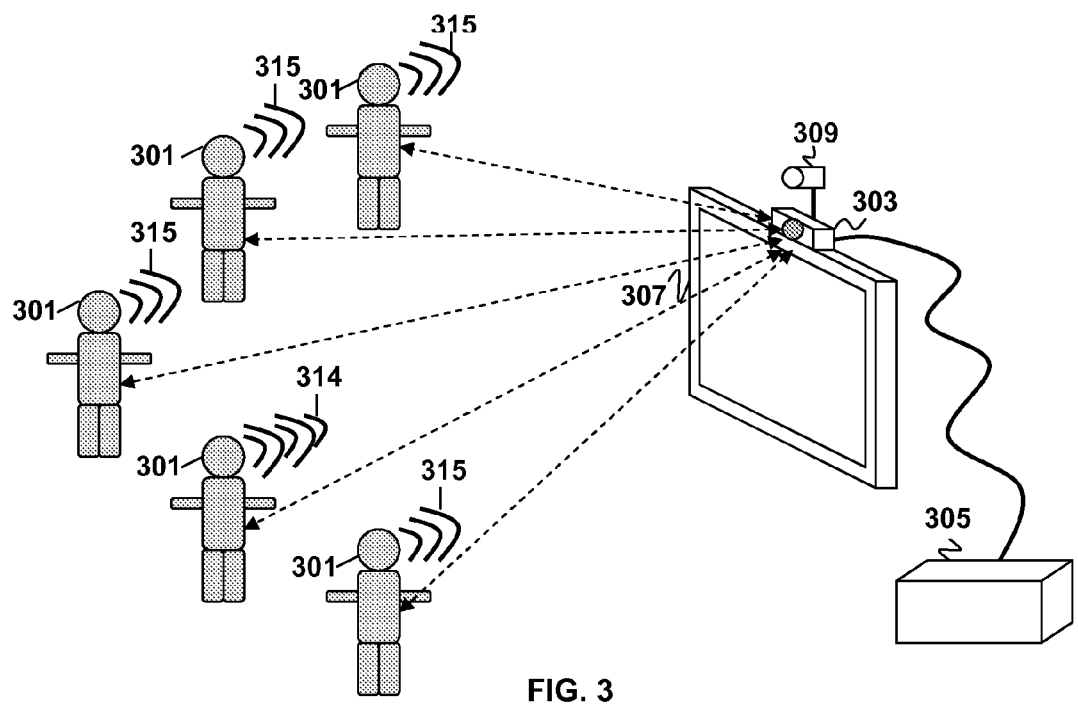
FIG. 3 is a schematic diagram illustrating use of a thermal imaging interface according to an alternative embodiment of the present invention.

FIG. 3 illustrates an example of a system that uses thermal infrared imaging to identify the speaker amongst a group of users according to an embodiment of the present invention. Again, a thermographic camera 303 can be coupled to a computer processing system 305. The thermographic camera 303 can be positioned proximate a video display 307 that is coupled to the processing system 305 such that the users 301 face the camera 303 when facing the display 307. Additionally, a visible light camera 309 can be positioned to face the same direction as the thermographic camera 303 and used as an auxiliary sensor.

Initially, the visible camera 309 will identify all the users 301 in the room, for example, by using face tracking and identification. Any difficulties the processing system 305 may have in may have in identifying the users 301 by analyzing images obtained with the visible light camera 309 may be cured by complementing the visible light camera image data with thermal imaging data as described above. The processing system 305 may analyze images from the thermographic camera 303 to detect a respiration rate 315 of each user 301 by measuring the airflow around the user's nose and mouth as well as the temperature near the user's nose and mouth from thermographic patterns in the images. The information extracted may include determining when a breath starts or stops, the duration of a breath, or the duration of not breathing, e.g., an interval between breaths, the orientation of the breath, and whether the breath involves inhaling or exhaling. For a more detailed description of the thermographic camera's role as a breath detector, please refer to U.S. patent application Ser. No. 12/889,347, which has been incorporated herein by reference.

A user's respiration rate 315 may be then used to identify many different characteristics associated with that particular user. In one example, the respiration rate 315 as determined by the thermographic camera 303 can be used to identify whether a particular user is speaking. Using each user's respiration pattern 315 as a baseline, the computer processing system 305 may recognize when a user is speaking 314 by locating irregularities in that user's respiration pattern 315. A particularized change in a user's respiration pattern 315 may indicate that the user is in the process of speaking 314. As illustrated in our example, amongst a large group of users 301, the thermographic camera 303 may be particularly useful in identifying which of those users is in the process of speech 314.

Use of a thermographic camera 303 to detect a user's respiration rate avoids the need for more intrusive detection mechanisms (e.g., headsets, microphones). Eliminating the need for a user to strap on sensors to his body in order to provide respiratory information to a computer program will greatly enhance the user's experience and comfort level.

Use of a user's respiration rate as determined by a thermographic camera to control a computer program is not limited to speech detection. There are a number of different computer applications that can use a thermal imaging interface. For example, there are computer applications that judge a user's singing by capturing sounds of that person singing with a microphone and analyzing the sounds to determine the pitch, timing, and lyrics of the singing. These characteristics can be compared to some reference parameters for the pitch, timing, and lyrics of a particular song. The criteria for judging the user's singing ability may be greatly enhanced by introducing the user's breathing as a judgment parameter. A computer program may use information from thermographic images to determine the timing of the user's breath during the duration of the song. This may then be compared to reference parameters that will result in a more accurate determination of the user's singing ability.

Additionally, a user's respiration pattern may be used for speech recognition and security. As discussed above, a thermographic camera can be used to detect a user's respiration rate/pattern based on a user's breath. A computer processing system may then use this information to identify whether an image of a user's face actually corresponds to a real user by comparing the observed breathing pattern to a reference pattern. Furthermore, a particular user may be identified based on the user's individualized respiratory pattern during speech. Moreover, because all individuals have unique respiratory patterns, the thermographic camera may act as a security barrier to prevent unauthorized access to a computer program.

Identification of the user can be based on a combination of face identification from analysis of a visible light image, speaker identification by voice, and respiration pattern identification by analysis of the user's breath as determined from thermographic images. The use of combinations of different modes of user identification provide a good mechanism to counter attempts at counterfeit user identification through use of a picture and recording to cheat systems that identify the user by face and voice only. Analysis of the respiration pattern when one is speaking can be of particular importance to improve the identification performance.

When the thermographic camera identifies an authorized user based in whole or in part on his respiratory pattern, access to the computer program will be granted. When the thermographic camera fails to recognize a particular thermographic image as corresponding to a real user or fails to recognize as user based on his respiratory pattern, access to the computer program will be denied. Such speech recognition enhancement may be implemented as a part of a first line of security or perhaps as an additional security mechanism that strengthens the existing security system in place.

Additional examples involving the use of a user's breath as a control input may be found in commonly-assigned U.S. patent application Ser. No. 12/889,347.

Figure 4:
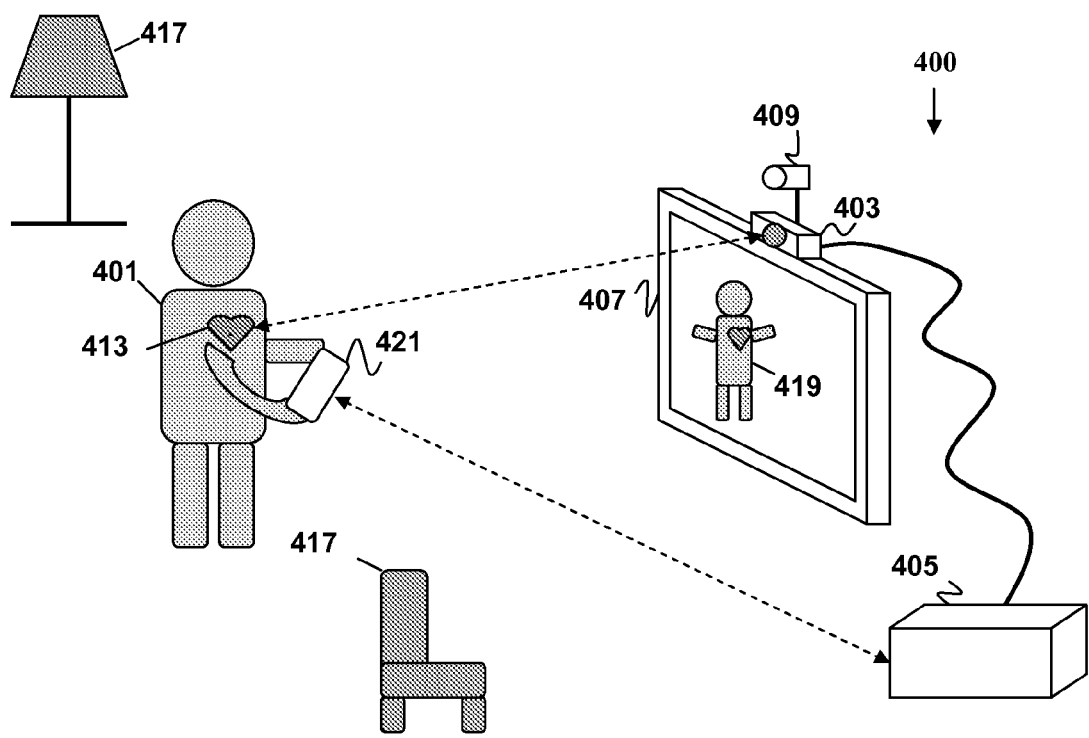
FIG. 4 is a schematic diagram illustrating use of a thermal imaging interface according to another alternative embodiment of the present invention.

Another embodiment of the present invention may use a thermographic camera to determine a user's heart rate. The detected heart rate can then be used as a control for a computer program. FIG. 4 illustrates an example of a system that can use thermal infrared imaging to identify a user's heart rate according to an embodiment of the present invention.

In the system 400 shown in FIG. 4, a thermographic camera 403 is coupled to a computer processing system 405. The thermographic camera 403 can be positioned proximate a video display 407 that is coupled to the processing system 405 such that the user 401 faces the camera 403 when facing the display 407. Additionally, a visible light camera 409 that is positioned to face the same direction as the thermographic camera 403, may be used as an auxiliary sensor.

The thermographic camera 403 obtains thermal infrared images of the user 401. These images record the blackbody radiation pattern associated with a user's body heat. From these images, the computer processing system 405 may measure a one or more vital signs 413 for one or more users, such as a user's heart beat rate, respiration rate, body temperature, or blood pressure. By way of example, and not by way of limitation, a user's heart beat rate may be measured by determining the rate or period of periodic temperature changes in the user's skin that result from the user's heart beat. A user's blood pressure might be estimated, e.g., from the amplitude of such periodic temperature changes. Respiration rate may be measured by determining the period of periodic temperature changes near the user's mouth and/or nose that result from the user's breathing. A user's body temperature may be determined from a long term average of temperature measurements over some relevant portion of the user's body. The temperature measurements may be subject to filtering, e.g., low pass filtering to remove rapid fluctuations over some relevant period of time. An additive or multiplicative offset may be applied to the long term average to account for differences between skin and core temperature.

Embodiments of the invention are not limited to just those implementations that use the particular vital signs mentioned in the foregoing examples. It is noted that certain embodiments may use vital signs other than heart beat rate, respiration rate, body temperature, and blood pressure. Such alternative vital signs may be extrapolated from measurements obtained by the thermographic camera 403. By way of example, and not by way of limitation, vital signs may be extrapolated from temporal or spatial variation of temperature at specific locations or average temperature or average temperature variation over some region of a thermographic image.

Determining a user's vital sign 413 through thermal imaging avoids the need to attach any intrusive devices (e.g., pulse monitor, pulse oximeter, blood pressure cuff, or thermometer) to the user, and provides the computer processing system 405 with additional control inputs for control of a program.

The user's vital sign 413 may be used as a control for various aspects of a computer program. By way of example, and not by way of limitation, a user's heart beat rate, respiration, rate, body temperature, or blood pressure, and the like may be used to control a program in the context of a video game. A particular video game may be required to scan the field of view of the thermographic camera 403 in order to determine the locations of users 401 and objects 417 that are used to create a virtual world that corresponds to the user's physical environment.

While various methods have already been described for differentiating objects from their surroundings, applying a user's vital sign 413 as a means for differentiation will act to supplement the above described methods. For example, one or more users' vital signs 413 such as heart beat rate, respiration rate, body temperature, blood pressure, and the like, may be utilized where a video game or computer program requires distinguishing living objects from inanimate objects 417. Because inanimate objects 417 are not prone to periodic surface temperature changes, they can be easily distinguished from living objects 401. As such, in a room full of objects (both living and inanimate), a computer processing system 405 will be able to distinguish between the two categories by using the thermal infrared images taken by the thermographic camera 403.

The processing system 405 can be configured to adjust a rate at which actions take place during execution of a program according to one or more users' vital signs. By way of example, and not by way of limitation, a user's heart rate may be used to control the animation of graphics 419 on the visual display 407. For example, the graphics 419 on the visual display 407 may be a virtual representation (i.e., avatar) of the user 401. By employing the user's heart rate 413 as a control input, the avatar's facial expressions, emotions, or other visual manifestations of the avatar may change accordingly. An excited user may have a correspondingly excited avatar that acts the part (e.g., frantic movements, exaggerated facial expressions, etc.). Similarly, a subdued user may have a correspondingly despondent avatar (e.g., muted movements, somber facial expressions, etc.). A user's respiration rate, blood pressure, body temperature, or other thermographically derived vital sign may be used to control computer animation in a similar fashion.

A user's vital sign 413 may alternatively be used to control more than the animation of graphics 419 in the context of a video game. For example, the vital sign may control other aspects of the video game as well, such as the pace at which the game is played. For example, if the user 401 is involved in an exercise game, the game could increase or decrease in difficulty in response to the user's heart rate, respiration rate, body temperature, blood pressure, and the like. By way of example, and not by way of limitation, when the user's heart rate or respiration rate is relatively slow, the game could increase in difficulty to provide a greater challenge to the user 401. When the user's heart rate or respiration rate increases to a point beyond his aerobic capacity, the game may decrease in difficulty to allow for the user to catch his breath and recover.

Furthermore, in certain embodiments of the present invention, the processor 405 may be configured to determine a health condition of a user from results of analysis of the one or more vital signs 413 and modify a state of execution of a program according to the determined health condition. By way of example and not by way of limitation, in an exercise game, a user's body temperature may rise during the course of exercise as the user's metabolism increases. Depending on the sensitivity of the thermographic camera 403, the processing system 405 may be able to identify users with uncharacteristically high or low body temperature (gauged, e.g., by the user's normal temperature or by expected temperatures for a typical person), which could indicate a fever or other health condition. That information could be used as an input and/or used to modulate the action going on in the game.

It is noted that embodiments of the invention may involve analysis of vital signs such as detecting temperature abnormalities for reasons other than exercise and measuring metabolism. Such analysis can involve other vital signs than body temperature. For example, if a user's typical body temperature is learned by the system 400, the system could determine that the user has a fever or other medical condition if the user's temperature is abnormally high (particularly in the absence of other indications like fast respiration and/or elevated heart beat rate). The processing system 405 could use this information as an input and change its state accordingly, e.g., by displaying a message notifying the user. The message may include a recommendation to contact a medical professional and/or provide relevant contact information. In some implementations the system 400 may even be configured to contact the medical professional, e.g., by email, video/voice chat, Skype connection, and the like, and transmit thermographic images from the thermographic camera 403 and/or and vital sign information from the processing system 405 to the medical professional for analysis in real time.

In alternative implementations, the system 400 may modify a state of execution of a program running on the processing system 405 in other ways in response to the determined health condition of the user 401. For example, the scene displayed on the display 407 (e.g., a game scene, television program, or video) to a scene that is more comfortable for viewing by a sick or weakened user in response to detection of such a condition in the user. The volume and nature of sound presented in conjunction with the scene displayed may similarly be modified.

Vital signs such as heart beat or respiration rate can also be used to control how background sounds or music is played. For example, in the context of video game play involving gun shooting, the firing rate can be increased or decreased with changes in the user's heart beat or respiration rate. A fixed number of bullets (e.g., three) may be fired per heart beat or breath. The vital sign can be mapped to trigger an action of a virtual object such as a missile or projectile that appear during game play. For example, the vital sign can determine how fast a missile rotates while moving forward. In other embodiments, the processing system 405 can synchronize the tempo of background music to the user's vital sign, such as heart beat or respiration rate. For example, the system can up sample or down sample the heart beat or respiration rate to generate background sounds (e.g., gunfire or a drum beat) at some multiple or sub-multiple of the heartbeat rate. A drum beat synthesized in this way may be blended into the background music.

Additionally, a user's vital sign 413 may be coupled with a user interface device 419 (e.g., controller, keyboard, joystick, etc.) to control certain aspects of the computer program. A user's vital sign 413 may control the response speed of the user interface device 421. For example, where the user 401 is using a controller 421 to direct the functionality of a virtual weapon in a virtual world, the user's heart rate may be used to control the trigger response time. As the user's heart rate increases, so too does the response speed of the weapon. The controller 421 may communicate directly with the computer processing system 405 to obtain relevant information regarding the user's vital sign 413. Adjusting the user interface's 421 response settings in accordance with the user's dynamic vital sign 413, will give the user a more realistic and authentic game play experience.

Figure 5:
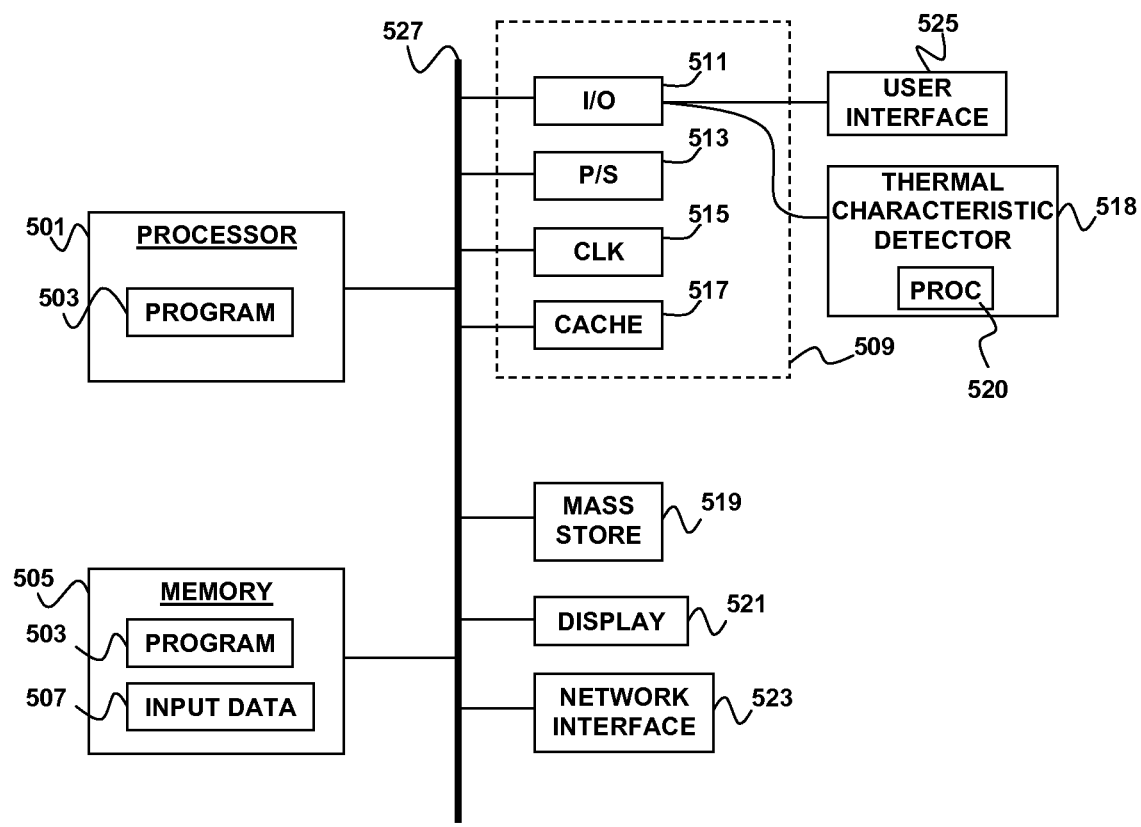
FIG. 5 is a block diagram depicting an example of a computer implemented apparatus that uses a thermal imaging interface in accordance with an embodiment of the present invention.

FIG. 5 illustrates a block diagram of a computer apparatus 500 that may be used to implement control of a computer program using a thermal imaging interface as described above. The apparatus 500 generally may include a processor module 501 and a memory 505. The processor module 501 may include one or more processor cores. As an example of a processing system that uses multiple processor modules, is a Cell processor, examples of which are described in detail, e.g., in Cell Broadband Engine Architecture, which is available online at http://www-306.ibm.com/chips/techlib/techlib.nsf/techdocs/1AEEE1270EA2776387257060006E61BA/$file/CBEA_01_pub.pdf, which is incorporated herein by reference.

The memory 505 may be in the form of an integrated circuit, e.g., RAM, DRAM, ROM, and the like). The memory may also be a main memory that is accessible by all of the processor modules 501. In some embodiments, the processor module 501 may include local memories associated with each core. A program 503 may be stored in the main memory 505 in the form of processor readable instructions that can be executed on the processor modules 501. The program 503 may include instructions configured to implement a thermal imaging interface method for controlling a computer program, as described above. In particular the program instructions may be configured to obtain one or more thermal infrared images of one or more objects with one or more thermographic cameras; analyze the one or more infrared images; identify one or more characteristics of the one or more objects from the one or more thermal infrared images; and use the one or more characteristics as a control input in the computer program 503 or some other program executed by one or more of the processor modules 503. The program 503 may be written in any suitable processor readable language, e.g., C, C++, JAVA, Assembly, MATLAB, FORTRAN and a number of other languages. During execution of the program 503, portions of program code and/or data 507 may be loaded into the memory 505 or the local stores of processor cores for parallel processing by multiple processor cores.

Input data 507 may be stored in the memory 505. By way of example, and not by way of limitation, the input data 507 may include data representing user/object characteristics determined by the thermographic camera.

The apparatus 500 may also include well-known support functions 509, such as input/output (I/O) elements 511, power supplies (P/S) 513, a clock (CLK) 513 and cache 517. The apparatus 500 may optionally include a mass storage device 519 such as a disk drive, CD-ROM drive, tape drive, or the like to store programs and/or data. The device 500 may also optionally include a display unit 521, thermal characteristic detector 518, and user interface 525 to facilitate interaction between the apparatus 500 and a user. The display unit 521 may be in the form of a cathode ray tube (CRT) or flat panel screen that displays text, numerals, graphical symbols or images.

The thermal characteristic detector unit 518 can include a sensor that is sensitive to spatial and temporal variations in temperature sufficient to distinguish a user's heart rate, respiration rate, and location from measured temperature variations. In a preferred embodiment, the thermal characteristic detector unit 518 includes a thermographic camera, which may operate as described above with respect to FIG. 1. The values of temperature (or temperature difference) at each pixel of an image sensor in the thermographic camera can be stored in the memory 505 as an array. The program 503 can analyze the temperature patterns in the array to identify a user's location and to identify thermal patterns that correspond to a user's heart rate and respiration rate. This information may then be used as a control input.

In some embodiments, there may be more than one thermal characteristic detector unit 518. In some embodiments, each thermal characteristic detector unit 518 may optionally include or be coupled to a dedicated processor unit 520 running suitably configured instructions. In such embodiments, each dedicated processor unit can 520 be part of a distributed system in which each unit does at least some of the processing of the measurements made by the sensor of its corresponding detector unit 518. The output of each dedicated processor unit 520 can contribute to an input to a master control system, which may be implemented by the processor module 501. Such an implementation may simplify the design of the program 503 since the program need not be aware of the specifics of the thermal characteristic unit 518. Such a configuration also permits a certain amount of the processing load on the processor module 501 to be offloaded to the dedicated processors associated with the detector units 518. Consequently, the processor module 501 and program 503 may be less affected by the number of thermal characteristic detector units included in the apparatus 500.

By way of example, and not by way of limitation, the dedicated processor units 520 can be configured to analyze thermal infrared images obtained by a thermographic camera, identify one or more characteristics of the one or more objects from the one or more thermal infrared images, and use the one or more characteristics to provide a control input to the computer program 503.

The user interface 525 may optionally include a keyboard, mouse, joystick, light pen, microphone, conventional digital camera, accelerometer, gyroscope, or other device that may be used in conjunction with the thermal characteristic detector unit 518. The apparatus 500 may also include a network interface 523 to enable the device to communicate with other devices over a network, such as the internet. These components may be implemented in hardware, software or firmware or some combination of two or more of these.

The processor module 501, memory 505, user interface 525, network interface 521 and other components of the apparatus 500 may exchange signals (e.g., code instructions and data) with each other via a system bus 527.

Figure 6:
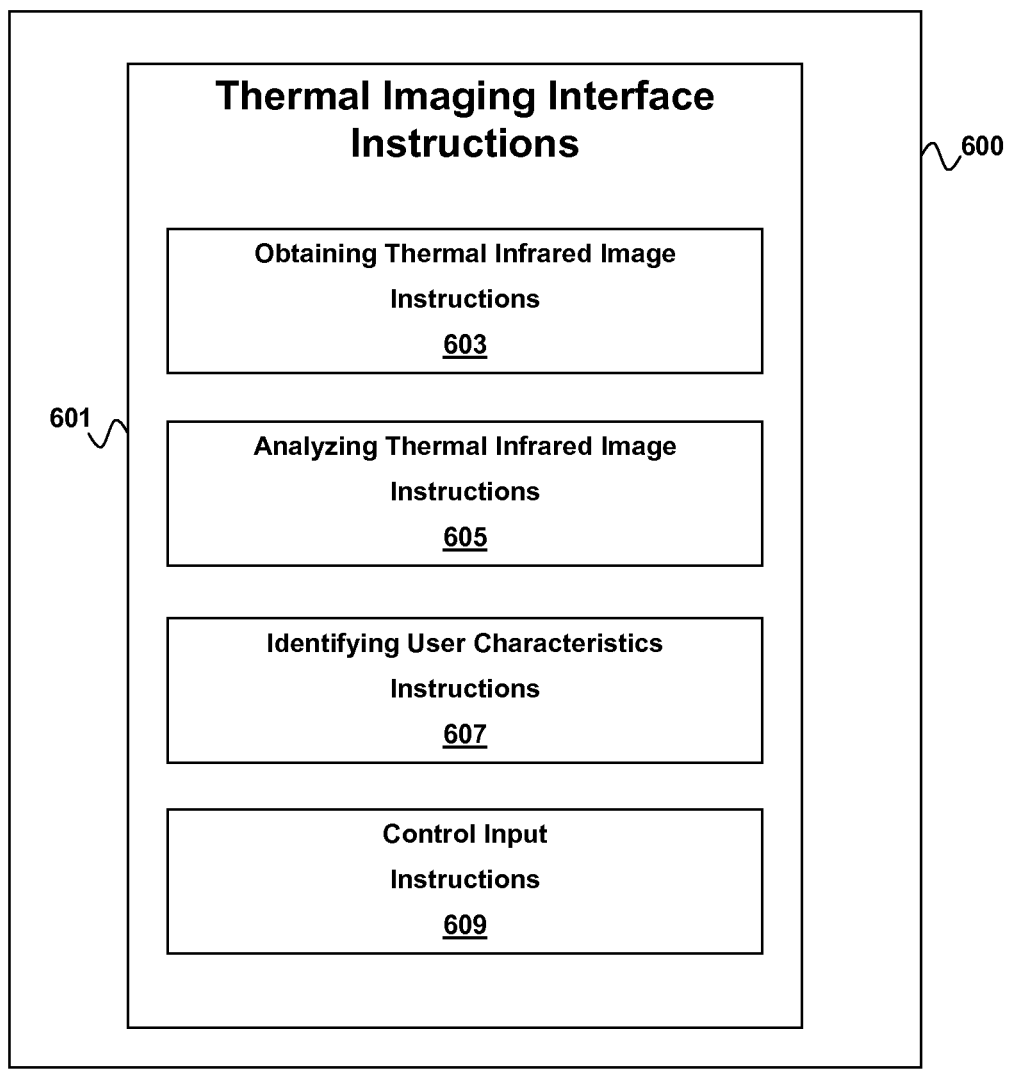
FIG. 6 is a block diagram illustrating a non-transitory computer readable medium containing computer-readable instructions for implementing a thermal imaging interface method according to an embodiment of the present invention.

According to another embodiment, instructions for carrying out a thermal imaging interface method for controlling a computer program may be stored in a computer readable storage medium. By way of example, and not by way of limitation, FIG. 6 illustrates an example of a non-transitory computer-readable storage medium 600 in accordance with an embodiment of the present invention. The storage medium 600 contains computer-readable instructions stored in a format that can be retrieved and interpreted by a computer processing device. By way of example and not by way of limitation, the computer-readable storage medium 600 may be a computer-readable memory, such as random access memory (RAM) or read only memory (ROM), a computer readable storage disk for a fixed disk drive (e.g., a hard disk drive), or a removable disk drive. In addition, the computer-readable storage medium 600 may be a flash memory device, a computer-readable tape, a CD-ROM, a DVD-ROM, a Blu-Ray, HD-DVD, UMD, or other optical storage medium.

The storage medium 600 contains thermal imaging instructions 601 configured to implement a thermal imaging interface. The thermal imaging instructions 601 may be configured to implement a thermal imaging interface method for control of a computer program in accordance with the methods described above with respect to FIG. 2 through FIG. 4. Specifically, the thermal imaging interface instructions 601 may include obtaining thermal infrared image instructions 603 that obtain one or more thermal infrared images of one or more users in a thermographic camera's field of view. The thermal imaging instructions 601 may further include analyzing thermal infrared image instructions 605. When executed, these instructions cause the processor to analyze the signal from the input device to determine the thermal patterns associated with the obtained thermal infrared images.

The thermal imaging instructions 601 may additionally include identifying user characteristics instructions 607 that may evaluate the thermal patterns obtained from the thermal infrared images to identify users and to determine certain characteristics (e.g., location, depth, respiration rate, and heart rate) associated with those identified users. The thermal imaging instructions 601 may optionally include control input instructions 609 that provide a control input to a computer program based on the user characteristics identified. These control inputs may then be used manipulate the computer program as described above.

Although the present invention has been described in considerable detail with reference to certain preferred versions thereof, other versions are possible. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6.

In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of any papers and documents incorporated herein by reference.

What is claimed is:

1. A thermal imaging interface method for control of a computer program, comprising:
   a) obtaining one or more thermal infrared images of one or more objects with one or more thermographic cameras;
   b) analyzing the one or more thermal infrared images;
   c) identifying one or more characteristics of the one or more objects from the one or more thermal infrared images, wherein the one or more objects include one or more users, wherein the one or more characteristics include one or more vital signs of the one or more of the users which are determined by measuring a temperature or temperature change in the one or more thermal infrared images of the one or more users; and
   d) using the one or more characteristics as a control input in the computer program.

2. The method of claim 1, wherein the computer program uses the one or more vital signs to control a pace of actions executed by the program.

3. The method of claim 2, wherein the pace of actions includes a tempo of music.

4. The method of claim 1, wherein the computer program uses the one or more vital signs to control one or more graphics executed by the computer program.

5. The method of claim 1, wherein the computer program uses the one or more vital signs to measure a performance of the one or more users in conjunction with the computer program.

6. The method of claim 1, wherein the computer program uses the one or more vital signs to distinguish living objects from inanimate objects.

7. The method of claim 1, wherein the computer program uses the one or more vital signs to control a response speed of one or more user interfaces executed by the computer program.

8. The method of claim 1, wherein the one or more vital signs is mapped to trigger an action of a virtual object.

9. The method of claim 1, wherein the one or more vital signs is sampled and used by the computer program to generate a sound.

10. The method of claim 1, wherein the one or more vital signs is a heart beat rate, respiration rate, body temperature, or blood pressure.

11. The method of claim 10, further comprising analyzing the one or more vital signs and determining a health condition of a user from results of analysis of the vital signs.

12. The method of claim 1, wherein the one or more characteristics in c) include a respiration pattern for one or more users determined by measuring the airflow and temperature change around the nose and mouth of the one or more users.

13. The method of claim 12, wherein the respiration pattern for the one or more users is used to identify a source of sounds originating amongst the one or more users.

14. The method of claim 12, wherein the respiration pattern for the one or more users is used to determine whether the one or more of the users is an authorized user.

15. The method of claim 1, wherein the one or more characteristics in c) include a depth of the one or more objects in relation to the one or more thermographic cameras determined by infrared reflection coupled with interpolation using the one or more thermal infrared images.

16. The method of claim 15, wherein d) includes using the one or more characteristics for each of the one or more users in combination with one or more normal images of the one or more users to track the movement of one or more body parts associated with the one or more users.

17. The method of claim 1, wherein the one or more characteristics in c) include a segmentation cue that distinguishes the one or more objects from their background.

18. An apparatus for control of a computer program, comprising:
   one or more thermographic cameras;
   one or more processors coupled to the one or more thermographic cameras; and
   instructions executable by the one or more processors configured to:
   a) obtain one or more thermal infrared images of one or more objects with the one or more thermographic cameras;
   b) analyze the one or more thermal infrared images;
   c) identify one or more characteristics of the one or more objects from the one or more thermal infrared images, wherein the one or more objects include one or more users, wherein the one or more characteristics include one or more vital signs of the one or more of the users which are determined by measuring a temperature or temperature change in the one or more thermal infrared images of the one or more users;

d) use the one or more characteristics as a control input for a computer program.

19. The apparatus of claim 18, wherein the one or more characteristics in c) include a respiration rate for each of the one or more users determined by measuring the airflow and temperature change around the nose and mouth of the one or more users.

20. The apparatus of claim 18, wherein the one or more characteristics in c) include a depth of the one or more objects in relation to the one or more thermographic cameras determined by infrared reflection coupled with interpolation using the one or more thermal infrared images.

21. The apparatus of claim 18, wherein the one or more thermographic cameras include a thermographic camera mounted to a video display that is coupled to the processor.

22. The apparatus of claim 18, wherein the one or more processors include one or more dedicated processors, wherein each of the one or more thermographic cameras is coupled to a corresponding dedicated processor.

23. The apparatus of claim 22, wherein b), c) and d) are implemented by the one or more dedicated processors.

24. A computer program product, comprising:
a non-transitory computer-readable storage medium having computer readable program code embodied in said medium for controlling a computer program using a thermal image interface, said computer program product having:
  a) computer readable program code means for obtaining one or more thermal infrared images of one or more objects with one or more thermographic cameras;
  b) computer readable program code means for analyzing the one or more thermal infrared images;
  c) computer readable program code means for identifying one or more characteristics of the one or more objects from the one or more thermal infrared images, wherein the one or more objects include one or more users, wherein the one or more characteristics include one or more vital signs of the one or more of the users which are determined by measuring a temperature or temperature change in the one or more thermal infrared images of the one or more users; and
  d) computer readable program code means for using the one or more characteristics as a control input in the computer program.

25. The method of claim 1, wherein the computer program is a computer entertainment program.

26. The method of claim 25, wherein the control input causes a change of state in a video game.

* * * * *